(12) United States Patent
Perkins

(10) Patent No.: US 11,685,203 B1
(45) Date of Patent: Jun. 27, 2023

(54) MULTI-COMPONENT QUICK ASSEMBLY TRAILER HITCH GUIDE

(71) Applicant: Jessie B. Perkins, Centerville, OH (US)

(72) Inventor: Jessie B. Perkins, Centerville, OH (US)

(*) Notice: Subject to any disclaimer, the term of this patent is extended or adjusted under 35 U.S.C. 154(b) by 0 days.

(21) Appl. No.: 18/168,625

(22) Filed: Feb. 14, 2023

(51) Int. Cl.
*B60D 1/36* (2006.01)
*B60D 1/42* (2006.01)

(52) U.S. Cl.
CPC ............... *B60D 1/36* (2013.01); *B60D 1/363* (2013.01); *B60D 1/42* (2013.01)

(58) Field of Classification Search
CPC . B60D 1/36; B60D 1/363; B60D 1/40; B60D 1/42
See application file for complete search history.

(56) References Cited

U.S. PATENT DOCUMENTS

| | | | |
|---|---|---|---|
| 4,666,176 A | 5/1987 | Sand | |
| 5,035,441 A * | 7/1991 | Murray | B60D 1/36 116/28 R |
| 6,517,098 B2 * | 2/2003 | Grasso | B60D 1/36 116/28 R |
| 6,612,603 B2 * | 9/2003 | Alger | B60D 1/36 359/872 |
| 6,820,888 B1 | 11/2004 | Griffen | |
| 6,916,109 B2 * | 7/2005 | Julicher | B60D 1/36 362/540 |
| 7,431,318 B1 * | 10/2008 | Frades | B60D 1/36 116/28 R |
| 7,753,393 B2 * | 7/2010 | Young | B60D 1/36 116/28 R |

* cited by examiner

*Primary Examiner* — Kevin Hurley
*Assistant Examiner* — Marlon A Arce
(74) *Attorney, Agent, or Firm* — R. William Graham

(57) ABSTRACT

A multi-component quick assembly trailer hitch guide for use with a trailer tongue having an inverted ball socket of a trailer and a trailer ball hitch on a vehicle includes multiple removably connectable sections each less than twenty four inches to permit economic shipping and storage.

3 Claims, 3 Drawing Sheets

MULTI-COMPONENT QUICK ASSEMBLY TRAILER HITCH GUIDE

BACKGROUND OF THE INVENTION

Field of the Invention

The present invention relates to a trailer hitch guide for aiding an automobile driver in positioning an automobile so that a coupling member associated with the automobile can be aligned with a complementary coupling member associated with a trailer to be towed. More specifically, the present invention relates to a multi-component quick assembly trailer hitch guide for assisting in multi-angle alignment of the automobile and trailer coupling members.

Discussion of The Prior Art

Guides to assist a driver in single-handedly maneuvering an automobile so that an automobile coupling member, i.e., a hitch ball mounted upright adjacent the rear of an automobile or other towing vehicle, is positioned to be received within a trailer complementary coupling member, i.e., an inverted socket mounted facing downward in the hitch arm or tongue of the trailer. The correct mating position, or alignment, must be accomplished in a vertical, lateral, and longitudinal direction. The ball must be below but adjacent the socket (vertical alignment), the ball must not be to either the left or right of the socket (lateral alignment), and the ball must not be either in front of or behind the socket (longitudinal alignment). The ball and socket are relatively small, and the task is further complicated because the driver ordinarily cannot see either coupling member from the driver seat, when the members are within coupling range. If the driver is a novice or otherwise impaired, the alignment operation can be very time consuming and frustrating, with much trial and error. Skilled drivers who regularly perform hitching operations often take several attempts and adjustments to place the components in alignment.

There have been many trailer hitch guides employ visual aids associated with the automobile and trailer to help the driver align the coupling members. Various means are used to mount the visual aids on the vehicles to disclose to the driver the position of the ball relative to the socket. By maneuvering the automobile while observing the visual aids, the driver tries to move the ball into position under the socket with as few maneuvers as possible.

The thrust of the art trailer guides are aimed with a common goal, i.e., to assist the driver in alignment of these couplings. The prior devices use two sighting components, each component consisting of a base, and a supporting rod mounted in the base. Each base is positioned on a metallic surface in the vicinity of the associated coupling assembly, and the tip of each rod is positioned directly above the associated coupling member at a predetermined distance above the ground. The driver moves the car until the tips coincide. Some of these vary in complexity, ease of use and install. Additionally, conventional guides vary in cost, reusability, repairability, set up and suitable storability. While these prior devices have met with commercial success, there remains a need to provide an improved trailer guide.

SUMMARY OF THE INVENTION

It is an object to improve a trailer hitch guide.
Another object is to ease the setup and breakdown of a trailer hitch guide.

It is still another object to ease repairability of a trailer hitch guide.

Yet another object is to provide an improved trailer hitch guide that is multi-component to be easily shipped yet easy to put together.

A multi-component quick assembly trailer hitch guide in accordance with one aspect of the present invention includes a first base plate connected to a trailer tongue at a first predetermined distance from an inverted ball socket of the trailer tongue, the first base plate having an upward extending cylindrical receiver. A first cylindrical position indicator is provided which includes multiple removably coupled sections, each section configured to be less than 24 inches wherein a first section has an end complementary sized to be removably retained by the upward extending receiver and a second section extends laterally relative to the first section having a first end connected to a second end of the first section and a second end of the second section including a visual position indicator which when the first section is fixably retained by the first upward extending cylindrical receptacle and coupled to the second section, the second section extends laterally approximately the first predetermined distance from the first base plate with the visual position indicator over the inverted ball socket.

A second base plate is provided which is connected laterally to a trailer ball hitch which is connected to a vehicle and the second base plate. The second base plate has an upward extending cylindrical receiver. A second cylindrical position indicator is provided which includes multiple removably coupled sections, each section configured to be less than 24 inches wherein a first section has an end complementary sized to be removably retained by the upward extending receiver and a second section extends laterally relative to the first section having a first end connected to a second end of the first section and a second end of the second section including a visual position indicator which when the first section is fixably retained by the upward extending cylindrical receiver and coupled to the second section, the second section extends laterally approximately the second predetermined distance from the second base plate with the visual position indicator generally adjacent a vertical axis through the ball hitch.

The first ends of the first sections can include an opening which can be co-aligned with a bore in a respective first and second upward extending receiver to enable the fixation of the first section to the respective first and second upward extending receiver. The sections of each cylindrical position indicator can be removably connected to each other by way of a respective coupling which like above can include an opening which can be co-aligned with a bore in a section end to enable the fixation of the first section to the respective second section.

Additional advantages of a trailer hitch guide in accordance with the present invention will be apparent from the detailed description of the invention with reference to the drawings.

DETAILED DESCRIPTION OF THE INVENTION

Figure 1:
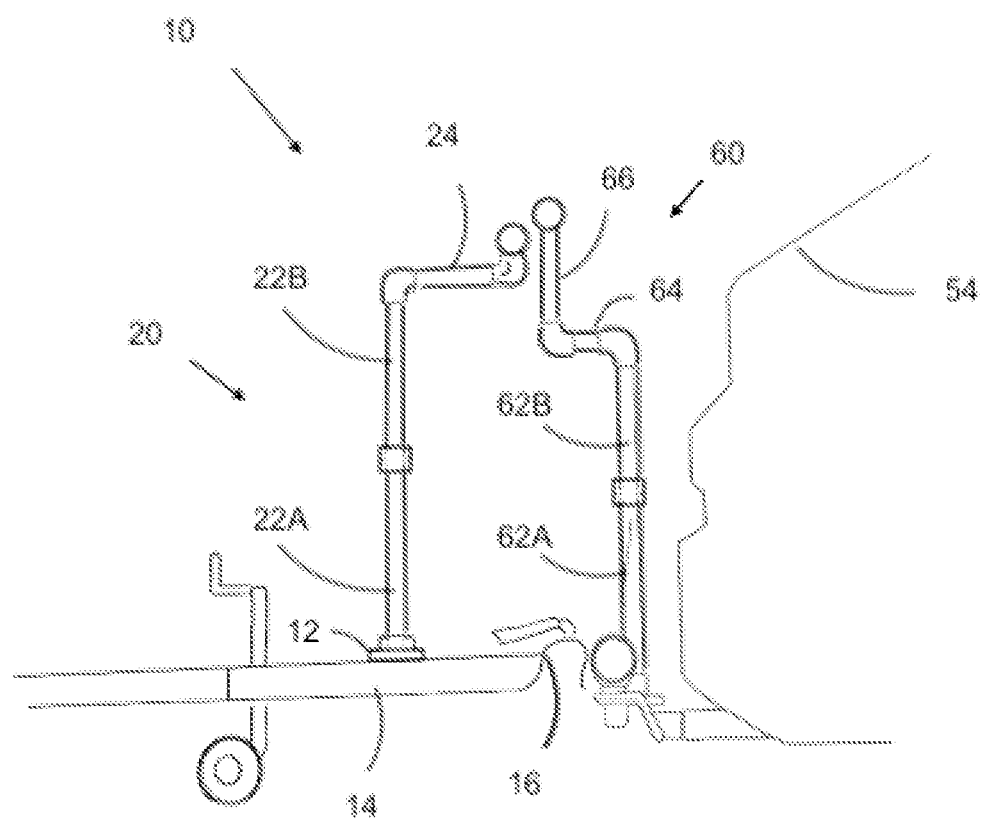
FIG. 1 shows perspective view of two position indicators of the invention in a first setup mode.
Figure 2:
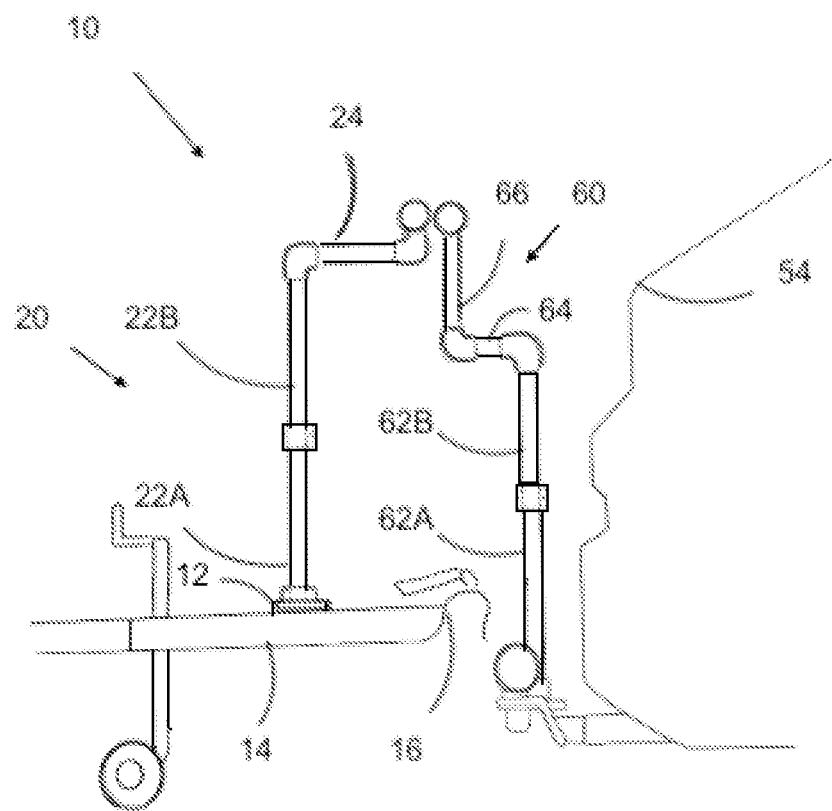
FIG. 2 shows a perspective view of two position indicators of the invention mounted adjacent an automobile trailer ball hitch and a inverted ball socket of the trailer tongue in a second mode ready for movement toward one another.
Figure 3:
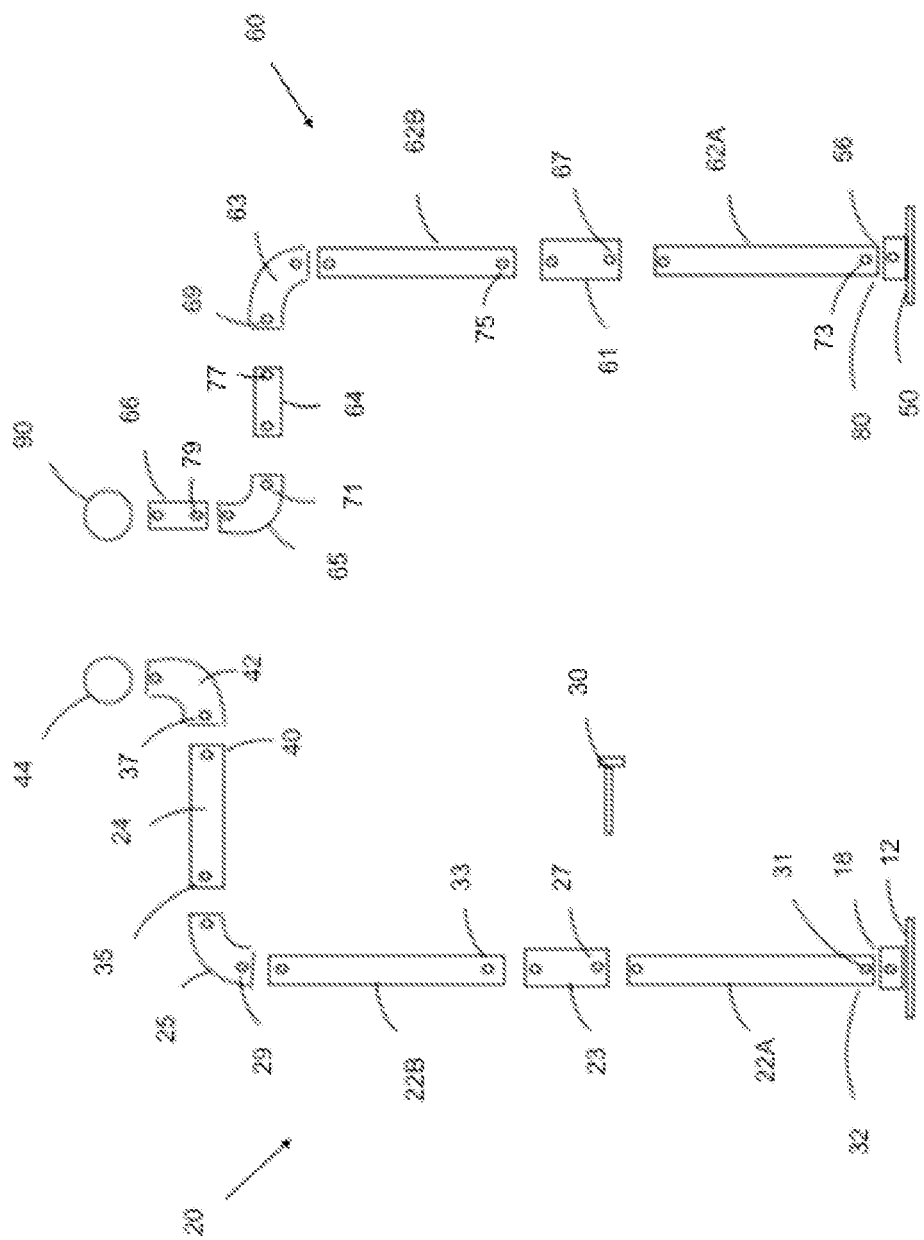
FIG. 3 shows a side view components of the invention in an exploded position.

Referring now to the drawings, the multi-component quick assembly trailer hitch guide for assisting in multi-angle alignment of the automobile and trailer coupling member is generally designated by the number 10.

The multi-component quick assembly trailer hitch guide 10 in accordance with one aspect of the present invention includes a first base plate 12 connected to a trailer tongue 14 at a first predetermined distance x from an inverted ball socket 16 of the trailer tongue 14. The first base plate 12 has an upward extending cylindrical receiver 18.

A first cylindrical position indicator 20 is provided which includes multiple removably coupled sections 22A, 22B, 24, wherein a straight coupling 23 connects section 22A and 22B and a right angle coupling 25 connects sections 22B and 24, respectively. Each of these couplings 23, 25 and 42 can have an openings 27, 29, and 37, respectively, which can be co-aligned with a bores 31, 33 and 35 in respective sections 22A, 22B and 24 to enable the positional fixation therebetween by insertion of locking pins 30 into co-aligned openings 27 and 29 with their respective bores 31, 33, and 35.

Each section 22A, 22B and 24 are configured to be less than 24 inches and couplings 23 and 25 are several inches long. In a preferred embodiment, section 22A has an end 32 complementary sized to be removably retained by the upward extending receiver 18 and a section 24 extends laterally relative to the sections 22A and 22B and has a terminal end 40 of section 24 can be connected to a right angled coupling 42 and configured with a visual position indicator 44 (here shown as a bulb). When the sections 22A, 22B and 24 are fixably connected, the second section 24 extends laterally approximately the first predetermined distance x from the first base plate 12 with the visual position indicator 44 over the inverted ball socket 16.

A second base plate 50 is provided which is connected laterally a second predetermined distance y from a trailer ball hitch 52 which is connected to a vehicle 54. The second base plate 50 has an upward extending cylindrical receiver 56.

A second cylindrical position indicator 60 is provided which includes multiple removably coupled sections 62A and 62B, 64, and 66 wherein a straight coupling 61 connects section 62A and 62B and right angle coupling 63 connects sections 62B and 64, respectively, and right angle coupling 65 connects section 64 and section 66. Each of these couplings 61, 63 and 65 can have an openings 67, 69, 71, respectively, which can be co-aligned with a bores 73, 75, 77 and 79 in respective sections 62A, 62B, 64 and 66 to enable the positional fixation therebetween by insertion of locking pins 30 into co-aligned openings 67, 69, 71, with their respective bores 73, 75, 77 and 79.

Similarly, each section 62A, 62B, 64 and 66 are configured to be less than 24 inches wherein section 62A has an end 80 complementary sized to be removably retained by the upward extending receiver 56 and section 64 extends laterally relative to the sections 62A and 62B having a terminal end 82 connected an angled coupling 65 and includes a visual position indicator 90 which when the sections 62A, 62B, 64 and 66 are operably connected are fixably retained by the upward extending cylindrical receiver 56, such that the second visual position indicator 90 extends laterally approximately the second predetermined distance y from the extending cylindrical receiver 56 with the visual position indicator 90 generally adjacent a vertical axis through the ball hitch 52.

The two position indicators 44 and 90 of the present invention enables a driver a line of sight from the driver's compartment to properly and easily align a trailer hitch in position adjacent ball hitch. Position indicators 44 and 90 can be preferably made to be highly visible, such as formed from a light reflective material for night use here is shown as a ball of slightly larger diameter than the couplings 44 and 65.

The sections 22A, 22B, 24, 62A, 62B, 64 and 66 can be preferably cylindrical with a circular cross section and a longitudinal axis, although it is understood that these can be other geometric shapes. Couplings 23, 25, 61, 63, 65 are complementary configured to receive the sections 22A, 22B, 24, 62A, 62B, and 66. The parts can be formed from any suitable material, such as plastic or metal. Base plate 12 and 50 can be made of a suitable material, such as plastic or metal.

It is understood that the sections 22A, 22B, 24, 62A, 62B, 64 and 66 and couplings 23, 25, 61, 63, 65 can be configured with lengths as indicated within the length less than twenty four inches and are preferably straight portions and 90° bends as shown, but could have alternative shape or bends as long as they enable the invention to be carried out.

The configuration shown permits simultaneous alignment of the visual position indicators 44 and 90. In order to achieve proper alignment for coupling, the trailer coupling member must be aligned with the automobile coupling member vertically, laterally, and longitudinally. Proper vertical alignment means that the trailer coupling is above but adjacent to the automobile coupling, so that the inverted ball socket 16 can be lowered onto the ball hitch 52. Direct or lateral alignment can be achieved with the instant invention. Also shown is a jack assembly 54, used for raising or lowering the tongue 14. The trailer jack assembly 53 has a crank 54 mounted on a threaded shaft, which passes through a threaded portion associated with tongue 14. The threaded shaft connects to a wheel 57, which rests on the ground and supports the tongue 14. Vertical adjustment of tongue 14 is achieved by turning the crank 54. It can be appreciated that the invention enables alignment both laterally and longitudinally, sitting in the driver seat of the vehicle 54 and looking rearwardly along the line of sight can observe the lateral and longitudinal position of visual position indicators 44 and 90.

The driver can maneuver the vehicle 54 until the visual position indicators 44 and 90 coincide adjacent one another. The driver then knows to stop the automobile and proceed to lower the ball socket 16 onto the ball 52.

Although the invention disclosed here has been described in terms of an automobile and trailer, it is understood that the invention applies equally well to other vehicles to be coupled where two coupling members must be aligned. It should be understood that although specific embodiments of the invention have been described herein in detail, such description is for purposes of illustration only and modifications may be made thereto by those skilled in the art within the scope of the invention.

What is claimed is:

1. A multi-component quick assembly trailer hitch guide for use with a trailer tongue having an inverted ball socket of a trailer and a trailer ball hitch on a vehicle, which includes:

a first base plate connected to the trailer tongue at a first predetermined distance from the inverted ball socket of the trailer tongue, said first base plate having an upward extending receiver, a first position indicator having multiple removably coupled sections, wherein each section configured to be less than 24 inches wherein a first section has an end complementary sized to be removably retained by said upward extending receiver of said first base plate and a second section extends laterally relative to the first section having a first end connected to a second end of said first section and a second end of the second section including a visual position indicator which when said first section is fixably retained by said first upward extending receptacle and coupled to said second section, said second section extends laterally approximately said first predetermined distance from said first base plate with said visual position indicator over the inverted ball socket; and a second base plate connected laterally to the trailer ball hitch and has an upward extending receiver, a second position indicator having multiple removably coupled sections, each section configured to be less than 24 inches wherein a first section of said second position indicator has an end complementary sized to be removably retained by said upward extending receiver of said second base plate and a second section of said second position indicator extends laterally relative to said first section of said second position indicator having a first end connected to a second end of said first section of said second position indicator and a second end of said second section of said second position indicator including a visual position indicator which when said first section of said second position indicator is fixably retained by said upward extending receiver and coupled to said second section of said second position indicator, said second section extends laterally approximately said second predetermined distance from said second base member with said visual position indicator generally adjacent a vertical axis through the ball hitch.

2. The multi-component quick assembly trailer hitch guide of claim 1, wherein said first ends of said first sections include an opening which can be co-aligned with a bore in the respective first upward extending receiver and said second upward extending receiver to enable fixation of said first sections to said respective first upward extending receiver and said second upward extending receiver.

3. The multi-component quick assembly trailer hitch guide of claim 1, wherein said sections of each position indicator are removably connected to each other by way of a respective coupling which each include an opening which can be co-aligned with a bore in an end of each said section to enable fixation of each said first section to a respective said second section.

\* \* \* \* \*